No. 748,696. PATENTED JAN. 5, 1904.
J. M. BROWNING, Jr.
SOLAR HEATER.
APPLICATION FILED MAY 14, 1902.
NO MODEL.
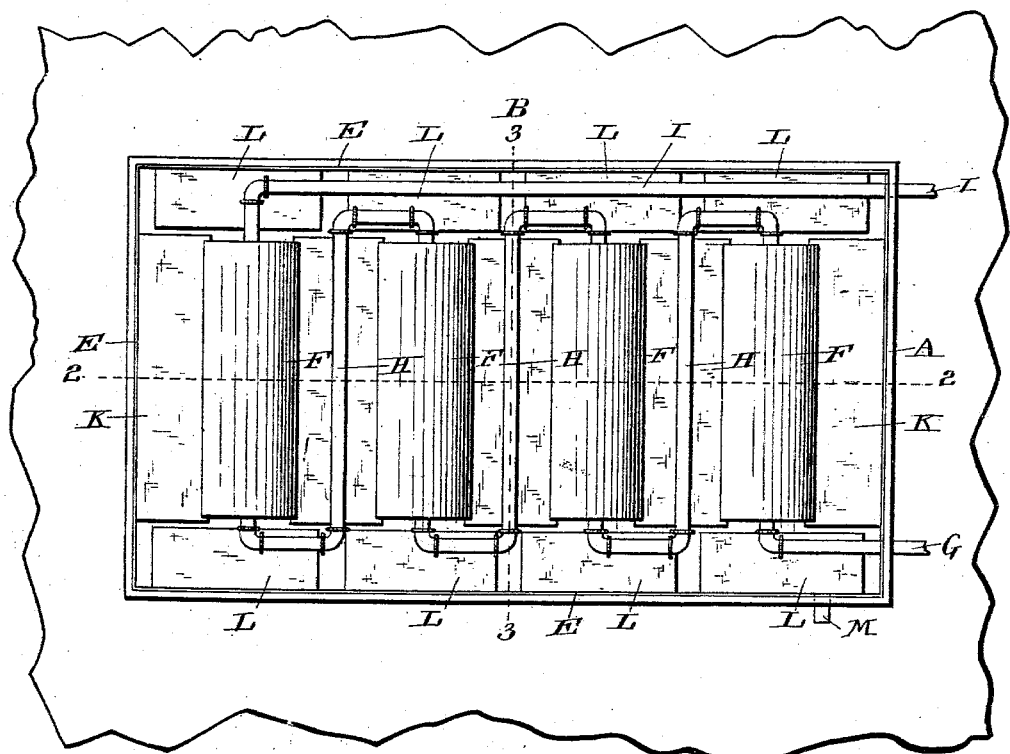
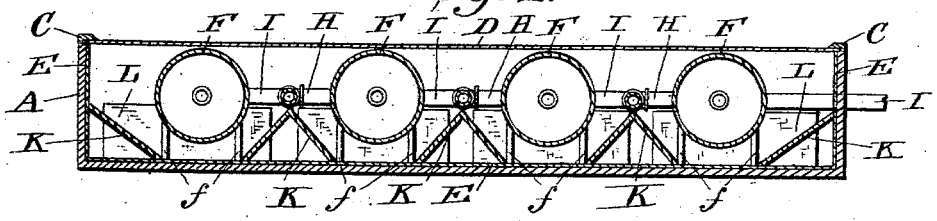
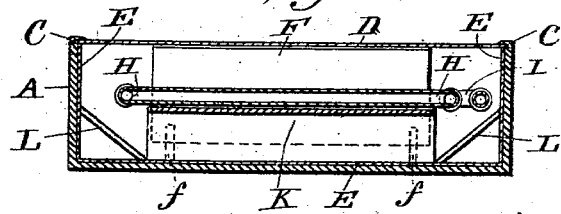

No. 748,696. Patented January 5, 1904.

UNITED STATES PATENT OFFICE.

JAMES MONROE BROWNING, JR., OF CORONA, CALIFORNIA.

SOLAR HEATER.

SPECIFICATION forming part of Letters Patent No. 748,696, dated January 5, 1904.

Application filed May 14, 1902. Serial No. 107,335. (No model.)

*To all whom it may concern:*

Be it known that I, JAMES MONROE BROWNING, Jr., a citizen of the United States, residing at Corona, in the county of Riverside and State of California, have invented certain new and useful Improvements in Solar Heaters, of which the following is a specification.

My invention relates to devices for utilizing the heat-rays of the sun for heating water, and has for its object to provide a device of that description that will utilize the maximum amount of the sun's heat. This object I attain by the mechanism hereinafter described, and illustrated in the accompanying drawings, in which—

Figure 1 is a top plan view of my invention, showing it placed in the roof of a building; Fig. 2, a section of Fig. 1 on the line 2 2; and Fig. 3, a section of Fig. 1, taken on the line 3 3.

Referring to the drawings, in which similar reference characters indicate corresponding parts throughout the several views, A represents a box which is preferably set into the roof B, so that its top C is level with the roof, the advantage of this construction being that the sides of the box are protected from the cold winds, as would not be the case if the box should be simply laid on the roof. It will also be apparent that in the Northern Hemisphere the best results would arise from selecting a gable-roof with a pitch toward the south because of the position of the sun. In case the above conditions are not at hand it will be readily understood that the box may be placed on any roof or other elevation, and if it is desired to expose it to the sun at an angle one side of the box may be supported in a raised position. The box top C is made removable, as desired, in order to get at its interior, and has a transparent medium D, such as glass, set therein to admit the sun's rays to the interior of the box. The inside of the box is lined with bright tin E to form a reflecting medium for the sun's rays, as well as make the box A water-tight.

The water-tanks, which in the drawings are shown to be four in number, are indicated by F; but I do not wish to be confined to any particular number of tanks, as it is obvious that the number may be increased or diminished, as desired, without affecting the spirit of my invention. Said tanks F are slightly raised above the bottom of the box A by legs *f* or other suitable means that will permit the heated air to get at all parts of the tanks F. G represents the cold-water service-pipe, which is connected to one of the end tanks F at its bottom. H represents pipes connecting the several tanks in pairs, each pipe connecting the top of one tank with the bottom of the succeeding one, and I the hot-water service-pipe connecting the top of the tank farthest removed from the cold-water supply with the bath-tub or other desired destination of said pipe. It will be readily understood from this construction of tanks and service and connecting pipes that the hottest water is always drawn off, while the water that passes from the tank immediately connected with the tank to which the service-pipe is connected to take the place of the water drawn off is the hottest in that tank, and the water that passes from the third tank to the second is the hottest in that tank, and so on to the tank connected with the cold-water supply.

K represent mirrors or any other suitable reflecting-surfaces set at an angle between the tanks F to reflect the heat-rays onto the sides and underneath portions of said tanks, and L mirrors set at an angle at the upper and lower sides of the box to reflect the heat-rays onto the ends of the tanks. In order that the tanks F and pipes G, H, and I may absorb all the heat-rays that may strike them, I paint their exteriors with a dull lusterless black paint, while the legs *f* are left with their metallic surfaces exposed in order that they may not absorb the heat-rays, but reflect them, or it may be found desirable to paint the legs *f* with a luster paint in order to better reflect the rays of the sun.

M is a drain-pipe connected with the lower part of box A to drain off any water that may leak from the tanks F or pipes G, H, and I.

It is a well-known fact that in heating a liquid the best results are obtained by applying the heat to the bottom or under portion of the vessel containing it, for the reason that as soon as the liquid at the bottom absorbs any heat it becomes lighter and ascends to the top, whereas if the heat were applied wholly at the top or upper portion of the containing vessel the heated liquid being at the top could not rise any higher, and would thereby prevent the remaining liquid from being heated except by such heat as might pass through the warmer liquid, which is a very slow process. It follows, therefore, that the more of the sun's rays that can be caused to strike the bottom or lower portion of the vessel the more effective will be the heater. Heretofore efforts have been made to secure this result by spacing the water-receptacles apart within the box or casing and placing mirrors or reflectors flatwise upon the bottom of the case coincident with the spaces between the receptacles; but such an arrangement is objectionable, because if the casing be set at an angle to the sun's rays the shadow of each receptacle will fall at a slant and partly cover the adjacent mirror, and if the casing be arranged so that the rays will be substantially perpendicular to the reflector part of them will be reflected back out through the top of the casing; but in either case the constant variation of the angle of the sun's rays caused by the varying inclination of the earth upon its axis will vary the efficiency of the heater according to the different seasons of the year. I have avoided these objections by arranging all of the reflectors except the uncovered portions of the tin-lined bottom at angles to the receptacles, those between the adjacent receptacles being arranged in pairs and inclined toward each other at the top or apex, which is preferably parallel with and substantially on a line with the center or axis of the receptacles. This will virtually form a chamber for each heater with inclined sides, a flat bottom, and an open top, from which it is impossible for any of the rays of the sun to escape after entering it except by being absorbed and carried off by the water. This is caused by the reflection of the rays from one reflector to the other underneath the receptacle and then up against the receptacle until they are finally absorbed, the position of the mirrors being such that none of the rays would be reflected out of the box, irrespective of the inclination of the box or the position of the sun in the heavens, and until they are finally absorbed the reflection of the rays from one mirror to the other below the receptacles causes the air beneath the receptacles to be heated, which in time imparts its heat to the bottom of the receptacle, and thereby increases the efficiency of the device. It has also been found very advantageous to heat the water in its passage from one tank or heater to the next one, and to take advantage of this principle I have located the pipe substantially midway between the receptacles which it connects and to arrange it on a line with the centers of the receptacles, whereby it is exposed to the direct rays of the sun at all times, irrespective of the inclination of the box or the seasons of the year. In addition to this I prefer to locate the pipe at the apex of the mirrors, which will cause it to cast the least shadow upon the mirrors and prevents it from casting a shadow upon the heater, which would be the case if it were located below the center of the receptacles and between either one of them and the reflector, and especially if the reflector were flat or if the pipe were arranged nearer one of the receptacles than the other.

By constructing a heater as above described I have produced a device in which the heat of the sun is utilized to a maximum degree and the effect of the position of the sun relatively thereto is reduced to a minimum, and it permits of the casing being arranged so as to cause the axis of the receptacles to stand parallel with or at right angles to the ridgepole, although I prefer to arrange them at right angles thereto.

I do not wish to be confined to the exact construction herein described, and shown in the drawings, as the same may be altered without departing from the spirit of my invention, a very evident substitution being a sheet of reflecting material at the upper and lower sides of box A instead of the short pieces L, shown in the drawings.

The prime purpose of my invention is the arrangement of the mirrors so as to reflect the rays of the sun upon all parts of the tanks not exposed to its direct rays.

Having thus described my invention, what I claim is—

1. In a solar heater, a casing provided with a transparent cover and having its interior formed into a plurality of chambers, each chamber being open at its top and having reflecting-walls, water-receptacles in the casing, one in each chamber, and a connector from one end of one of said receptacles to the other end of the adjacent receptacle.

2. In a solar heater, a casing provided with a transparent cover and having its interior formed into a plurality of chambers, each chamber being open at its top and having inclined reflecting sides, water-receptacles in the casing, one in each chamber, and a connector from one end of one of said receptacles to the other end of the adjacent receptacle.

3. In a solar heater, a casing provided with a transparent cover and having its interior formed into a plurality of chambers, each chamber being open at its top and having inclined reflecting sides, water-receptacles in the casing, one in each chamber, and a connector from one end of one receptacle to the opposite end of the adjacent receptacle, said connector being located substantially midway between the receptacles and at a point not lower than the respective centers thereof.

4. In a solar heater, a casing provided with a transparent cover, a plurality of water-receptacles arranged therein at a distance from and substantially parallel with each other, inclined reflectors arranged in pairs, between the adjacent receptacles, the apex of each pair of reflectors being substantially midway between its respective receptacles, and a connector from one end of one of the receptacles to the opposite end of the other receptacle, said connector extending along the apex of said reflectors.

5. In a solar heater, a casing, the top of which is transparent, a metallic reflecting-lining for the casing, a plurality of water-receptacles in the casing, said receptacles being substantially parallel with and at a distance from each other and at a distance from the bottom of the casing, inclined reflectors arranged in pairs between the adjacent receptacles, the apex of each pair being substantially midway between its respective receptacles and parallel and on a line with their axis, an inclined reflector at each end of the casing, an inclined reflector at each end of said receptacles, and a pipe leading from one end of one receptacle to the opposite end of the adjacent receptacle, said pipe being arranged at the apex of the reflectors between said receptacles.

In testimony whereof I hereto affix my signature in the presence of two witnesses.

JAMES MONROE BROWNING, Jr.

Witnesses:
BERT O. MILLER,
G. R. FREEMAN.